US012003977B2

(12) United States Patent
Bao et al.

(10) Patent No.: US 12,003,977 B2
(45) Date of Patent: Jun. 4, 2024

(54) UPLINK ASSISTED POSITIONING REFERENCE SIGNAL BEAM MANAGEMENT

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/173,362

(22) Filed: Feb. 11, 2021

(65) Prior Publication Data
US 2022/0256356 A1 Aug. 11, 2022

(51) Int. Cl.
*H04W 16/28* (2009.01)
*H04B 17/318* (2015.01)
*H04L 5/00* (2006.01)
*H04W 24/10* (2009.01)
*H04W 64/00* (2009.01)

(52) U.S. Cl.
CPC .......... *H04W 16/28* (2013.01); *H04B 17/318* (2015.01); *H04L 5/0048* (2013.01); *H04W 24/10* (2013.01); *H04W 64/006* (2013.01)

(58) Field of Classification Search
CPC ... H04W 16/28; H04W 24/10; H04W 64/006; H04W 64/003; H04B 17/318; H04L 5/0048
See application file for complete search history.

(56) References Cited

U.S. PATENT DOCUMENTS

| | | | | |
|---|---|---|---|---|
| 2017/0339658 | A1* | 11/2017 | Wang | G01S 5/021 |
| 2018/0149727 | A1* | 5/2018 | Ostrem | G01S 13/93 |
| 2018/0242327 | A1* | 8/2018 | Frenne | H04B 7/0404 |
| 2019/0104549 | A1* | 4/2019 | Deng | H04W 52/365 |
| 2019/0223043 | A1* | 7/2019 | Geng | H04L 5/0051 |
| 2019/0274061 | A1* | 9/2019 | Luo | H04W 56/001 |
| 2020/0236507 | A1* | 7/2020 | Manolakos | H04W 24/10 |
| 2020/0374749 | A1* | 11/2020 | Zhang | H04W 72/1289 |
| 2021/0235337 | A1* | 7/2021 | Byun | H04W 76/19 |
| 2022/0110085 | A1* | 4/2022 | Khoryaev | H04L 5/0051 |
| 2022/0182160 | A1* | 6/2022 | Su | H04L 5/14 |

FOREIGN PATENT DOCUMENTS

| | | |
|---|---|---|
| EP | 3923643 A1 | 12/2021 |
| WO | 2020164512 A1 | 8/2020 |
| WO | 2020206021 A1 | 10/2020 |

OTHER PUBLICATIONS

International Search Report and Written Opinion—PCT/US2021/060452—ISA/EPO—dated Feb. 23, 2022.

* cited by examiner

*Primary Examiner* — Ian N Moore
*Assistant Examiner* — Sun Jong Kim
(74) *Attorney, Agent, or Firm* — Thien T. Nguyen

(57) ABSTRACT

Techniques are provided for managing positioning reference signals in communication networks. A method of measuring downlink positioning reference signals includes transmitting one or more uplink positioning reference signals, receiving downlink positioning reference signal configuration information associated at least in part with the one or more uplink positioning reference signals, and measuring one or more downlink positioning reference signals based at least in part on the downlink positioning reference signal configuration information.

28 Claims, 14 Drawing Sheets

UPLINK ASSISTED POSITIONING REFERENCE SIGNAL BEAM MANAGEMENT

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements.

SUMMARY

An example method of measuring downlink positioning reference signals according to the disclosure includes transmitting one or more uplink positioning reference signals, receiving downlink positioning reference signal configuration information associated at least in part with the one or more uplink positioning reference signals, and measuring one or more downlink positioning reference signals based at least in part on the downlink positioning reference signal configuration information.

Implementations of such a method may include one or more of the following features. A location may be determined based at least in part on measurement values associated with the one or more downlink positioning reference signals. Assistance data including uplink positioning reference signal beam information may be transmitted. Measuring the one or more downlink positioning reference signals may include determining at least one of a time of arrival or a reference signal received power (RSRP) for at least one downlink positioning reference signal. Measuring the one or more downlink positioning reference signals may include determining a time difference of arrival for at least two or more downlink positioning reference signals. The one or more uplink positioning reference signals may utilize a first bandwidth and the one or more downlink positioning reference signals may utilize a second bandwidth that is different from the first bandwidth. The first bandwidth may be less than the second bandwidth. The one or more uplink positioning reference signals may utilize a first frequency layer and the one or more downlink positioning reference signals may utilize a second frequency layer that is different from the first frequency layer. The one or more downlink positioning reference signals may be quasi co-located with the one or more uplink positioning reference signals. The downlink positioning reference signal configuration information may include at least one of a repetition factor, a resource time gap, a muting pattern, a comb size, or quasi co-location (QCL) information.

An example method of providing downlink positioning reference signals according to the disclosure includes receiving one or more uplink positioning reference signal measurement values associated with a user equipment from one or more wireless nodes, determining a downlink positioning reference signal configuration based at least in part on the one or more uplink positioning reference signal measurement values, and providing the downlink positioning reference signal configuration to the one or more wireless nodes.

Implementations of such a method may include one or more of the following features. An outlier rejection process may be performed on the one or more uplink positioning signal measurement values. The method may include receiving assistance data including uplink positioning reference signal beam information from the user equipment, and determining the downlink positioning reference signal configuration based at least in part on the assistance data. The one or more uplink positioning reference signal measurement values may include at least one of an angle of arrival, a signal strength, or a time of arrival. The one or more uplink positioning reference signal measurement values may be associated with a first bandwidth, and the downlink positioning reference signal configuration may include downlink positioning reference signals configured for transmission with a second bandwidth that is different from the first bandwidth. The first bandwidth may be less than the second bandwidth. The one or more uplink positioning reference signal measurement values may be associated with uplink positioning reference signals transmitted in a first frequency layer, and the downlink positioning reference signal configuration may include downlink positioning reference signals configured for transmission in a second frequency layer that is different from the first frequency layer. The first frequency layer may comprise lower frequencies than the second frequency layer. Providing the downlink positioning reference signal configuration may include providing downlink positioning reference signal schedule information. The one or more wireless nodes may be a user equipment. The downlink positioning reference signal configuration information may include at least one of a repetition factor, a resource time gap, a muting pattern, a comb size, or quasi co-location (QCL) information.

An example apparatus according to the disclosure includes a memory, at least one transceiver, at least one processor communicatively coupled to the memory and the at least one transceiver, and configured to transmit one or more uplink positioning reference signals, receive downlink positioning reference signal configuration information associated at least in part with the one or more uplink positioning reference signals, and measure one or more downlink positioning reference signals based at least in part on the downlink positioning reference signal configuration information.

Implementations of such an apparatus may include one or more of the following features. The at least one processor may be further configured to determine a location based at least in part on measurement values associated with the one or more downlink positioning reference signals. The at least one processor may be further configured to transmit assistance data including uplink positioning reference signal beam information. The at least one processor may be further configured to determine at least one of a time of arrival or a reference signal received power (RSRP) for at least one downlink positioning reference signal. The one or more uplink positioning reference signals may utilize a first bandwidth and the one or more downlink positioning reference signals may utilize a second bandwidth that is different from the first bandwidth. The one or more downlink positioning reference signals may be quasi co-located with the one or more uplink positioning reference signals.

An example apparatus according to the disclosure includes a memory, at least one transceiver, at least one processor communicatively coupled to the memory and the at least one transceiver, and configured to receive one or more uplink positioning reference signal measurement values associated with a user equipment from one or more wireless nodes, determine a downlink positioning reference signal configuration based at least in part on the one or more uplink positioning reference signal measurement values, and provide the downlink positioning reference signal configuration to the one or more wireless nodes.

Implementations of such an apparatus may include one or more of the following features. The at least one processor may be further configured to perform an outlier rejection process on the one or more uplink positioning signal measurement values. The at least one processor may be further configured to receive assistance data including uplink positioning reference signal beam information from the user equipment, and determine the downlink positioning reference signal configuration based at least in part on the assistance data. The one or more uplink positioning reference signal measurement values may include at least one of an angle of arrival, a signal strength, or a time of arrival.

An example apparatus for measuring downlink positioning reference signals according to the disclosure includes means for transmitting one or more uplink positioning reference signals, means for receiving downlink positioning reference signal configuration information associated at least in part with the one or more uplink positioning reference signals, and means for measuring one or more downlink positioning reference signals based at least in part on the downlink positioning reference signal configuration information.

An example apparatus for providing downlink positioning reference signals according to the disclosure includes means for receiving one or more uplink positioning reference signal measurement values associated with a user equipment from one or more wireless nodes, means for determining a downlink positioning reference signal configuration based at least in part on the one or more uplink positioning reference signal measurement values, and means for providing the downlink positioning reference signal configuration to the one or more wireless nodes.

An example non-transitory processor-readable storage medium comprising processor-readable instructions configured to cause one or more processors to measure downlink positioning reference signals according to the disclosure includes code for transmitting one or more uplink positioning reference signals, code for receiving downlink positioning reference signal configuration information associated at least in part with the one or more uplink positioning reference signals, and code for measuring one or more downlink positioning reference signals based at least in part on the downlink positioning reference signal configuration information.

An example non-transitory processor-readable storage medium comprising processor-readable instructions configured to cause one or more processors to provide downlink positioning reference signals according to the disclosure includes code for receiving one or more uplink positioning reference signal measurement values associated with a user equipment from one or more wireless nodes, code for determining a downlink positioning reference signal configuration based at least in part on the one or more uplink positioning reference signal measurement values, and code for providing the downlink positioning reference signal configuration to the one or more wireless nodes.

Items and/or techniques described herein may provide one or more of the following capabilities, as well as other capabilities not mentioned. A user equipment (UE) may be configured to transmit one or more uplink positioning reference signals (UL PRS) with one or more beams. One or more base stations may be configured to receive the UL PRS and obtain measurement values such as angle of arrival, signal strength and timing information. The base stations may provide the measurement values to a network server. The network server may be configured to analyze the measurement values received from a plurality of stations and perform an outlier rejection process. The network server may utilize the UL PRS measurements to configure downlink positioning reference signals (DL PRS). The DL PRS configuration information may be provided to base stations in the network. The base stations may be configured to transmit the DL PRS based on the DL PRS schedule and configuration information received from the network server. The UL PRS and DL PRS may utilize different bandwidths and different frequencies. A location of the UE may be determined based on the DL PRS. Latency associated with DL PRS measurements may be decreased. Messaging overhead for DL PRS management may be reduced. Other capabilities may be provided and not every implementation according to the disclosure must provide any, let alone all, of the capabilities discussed.

DETAILED DESCRIPTION

Figure 1:
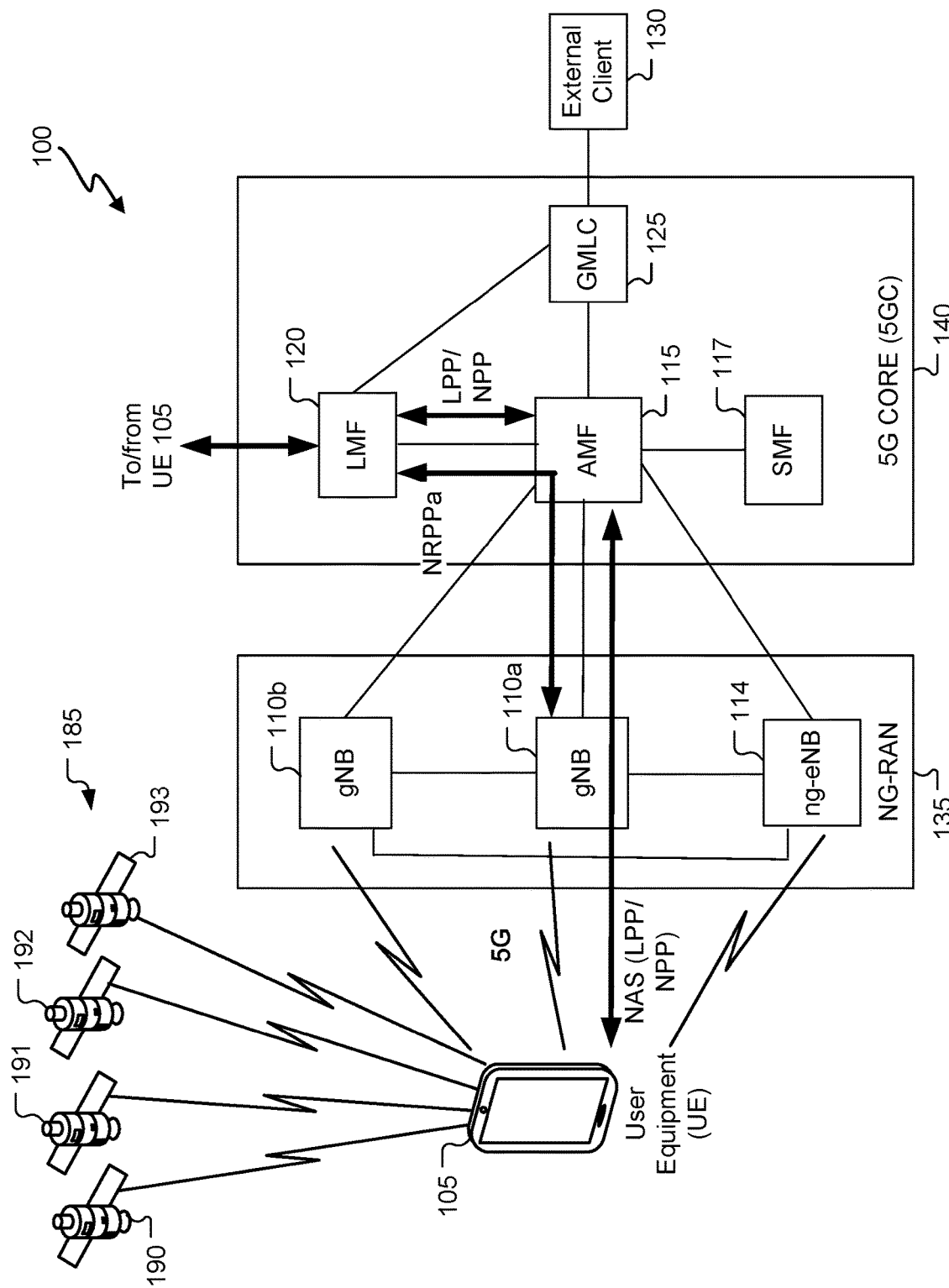
FIG. 1 is a simplified diagram of an example wireless communications system.

Techniques are discussed herein for providing and managing positioning reference signals in communication networks. In general, exchanges of positioning reference signals (PRSs) between network stations, such as a user equipment (UE) and a base station (BS), may be used to determine a location of a station. A base station may be configured to transmit downlink (DL) PRS to UEs, and UEs may be configured to transmit uplink (UL) PRS to base stations. The measurements associated with the PRS exchanges may be used to determine ranges between the stations via techniques such as, for example, time-of-arrival (ToA), time difference of arrival (TDoA), round trip time (RTT), reference signal time difference (RSTD), and a received signal strength indication (RSSI). In modern communication networks, such as 5G NR, the transceivers in the network stations may be configured to utilize beamforming technologies and thus able to determine bearing and elevation related measurements such as angle of arrival (AoA) and angle of departure (AoD).

The overhead associated with PRS beam management is proportional to the number of stations in a network, as well as the number of transmit and receive beams each station may use. For example, if a first station is configured to periodically transmit PRS beams (resources) at varying angles (e.g., azimuths and/or elevations), and a second station is configured to periodically sweep through receive beam angles, then there may be a delay between the pairing of aligned transmit and receive beams. Such a pairing process may cause latency in positioning applications.

The impact of beam pairing latency may be different for UL and DL PRS operations. In general, the latency associated with UL PRS transmitted from a UE may be less than the latency associated with DL PRS transmitted from a base station, because multiple base stations may receive a single UL PRS whereas a UE is required or may be required to measure each DL PRS individually (e.g., one by one). A potential drawback of UL PRS based positioning, however, is that UL transmissions from a UE may have limited transmit power which may impact the accuracy of the position estimate. The power limitation may also practically limit the bandwidth of the UL PRS in higher frequency bands. In contrast, DL PRS transmitted by a base station may utilize higher power and may provide an improved position estimate as compared to UL PRS methods. The techniques provided herein utilize UL PRS to reduce the latency associated with establishing beam pairing combinations, and then utilize DL PRS to determine the location of a UE.

In an embodiment, a UE may be configured with both DL and UL PRS. The network may utilize UL PRS transmitted by a UE to determine angle measurements, and then determine the beams to utilize for DL PRS. The UE may be configured to transmit the UL PRS with or without repetitions with the same or different transmit beams. In an example, the UE may report the UL PRS transmit beams it used in assistance data. The base stations may conduct PRS measurements based on the received UL PRS (e.g., AoA and timing info, signal strength). The base stations may report PRS measurements to a network server. The network server may be configured to reject outlier measurements based on gathered information to prune out incompatible receive beam options of certain base stations and certain UEs. The network server may be configured to schedule, reschedule, refine, and/or optimize the DL PRS scheduling based on the reports received from the base stations and/or assistance data provided by a UE. The network server may be configured to select transmit beam options across base stations based on time and frequency division multiplexing (TDM/FDM) patterns of the DL PRS, a reference cell selection, etc. The network server may provide DL PRS configuration information to the base stations and/or UE and initialize a DL PRS procedure with the base stations. These techniques and configurations are examples, and other techniques and configurations may be used.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
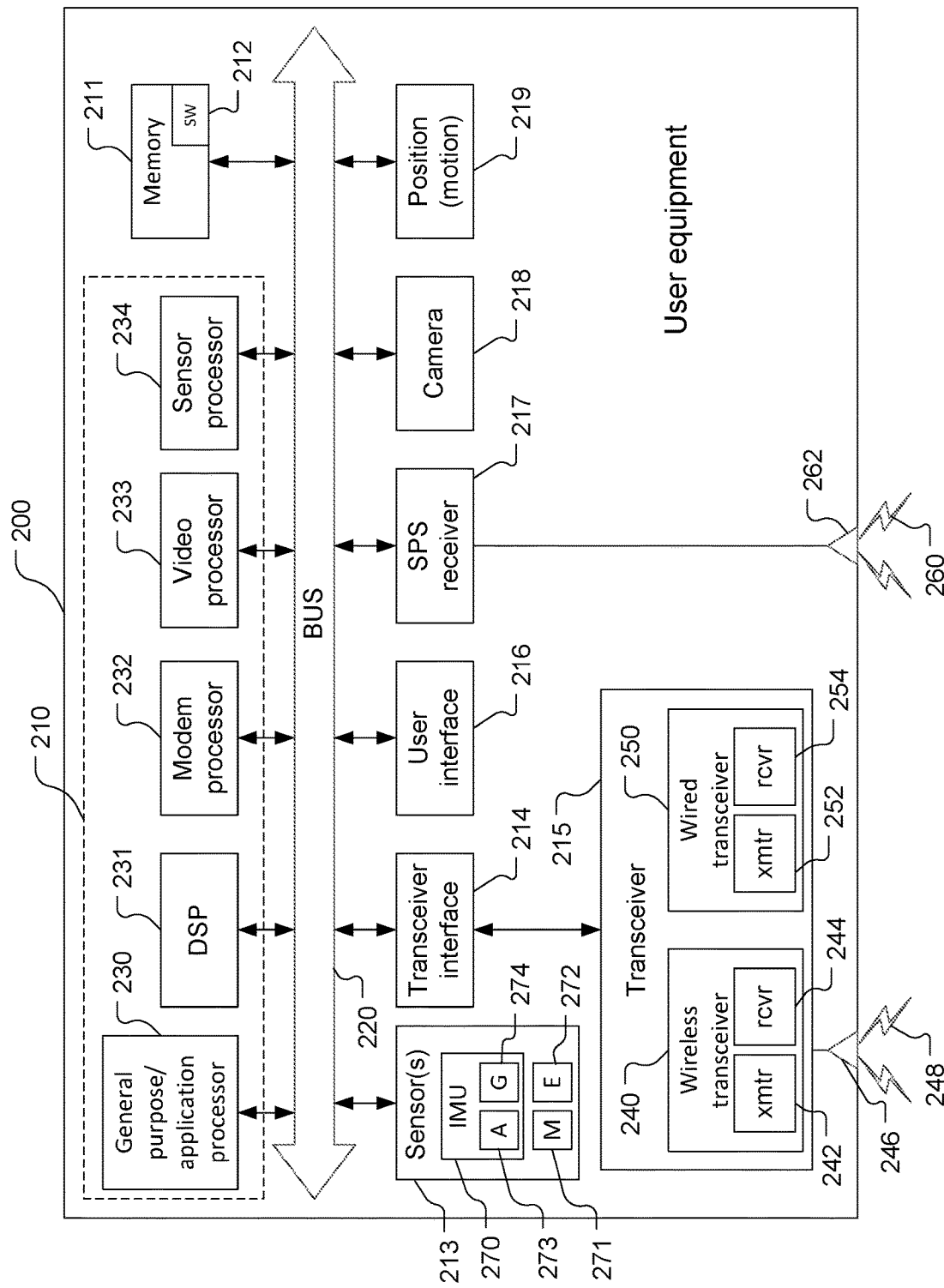
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
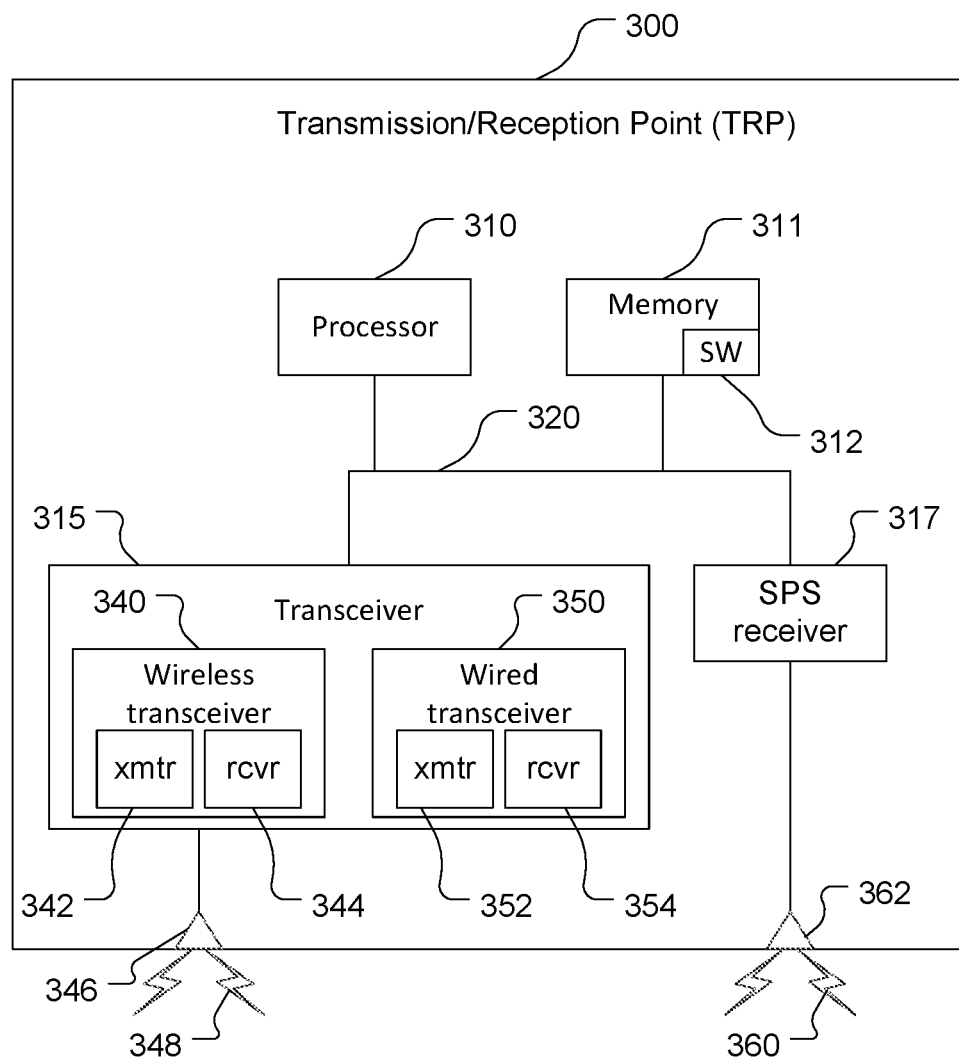
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
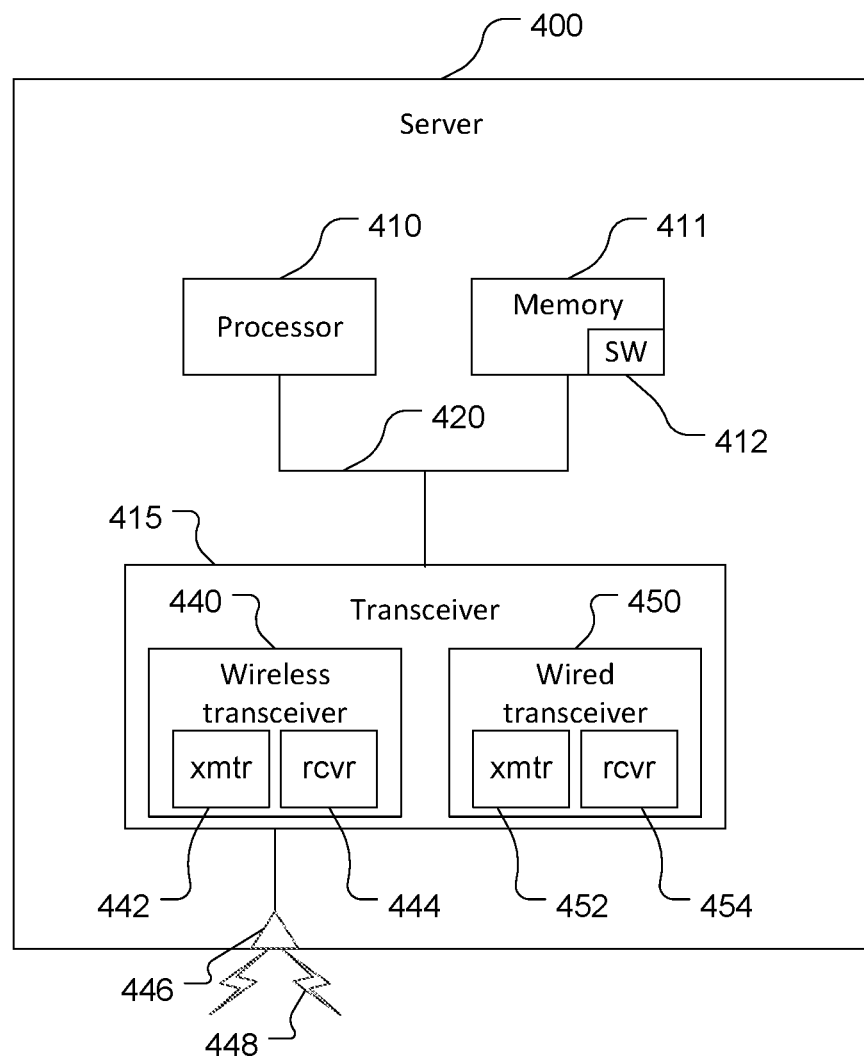
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
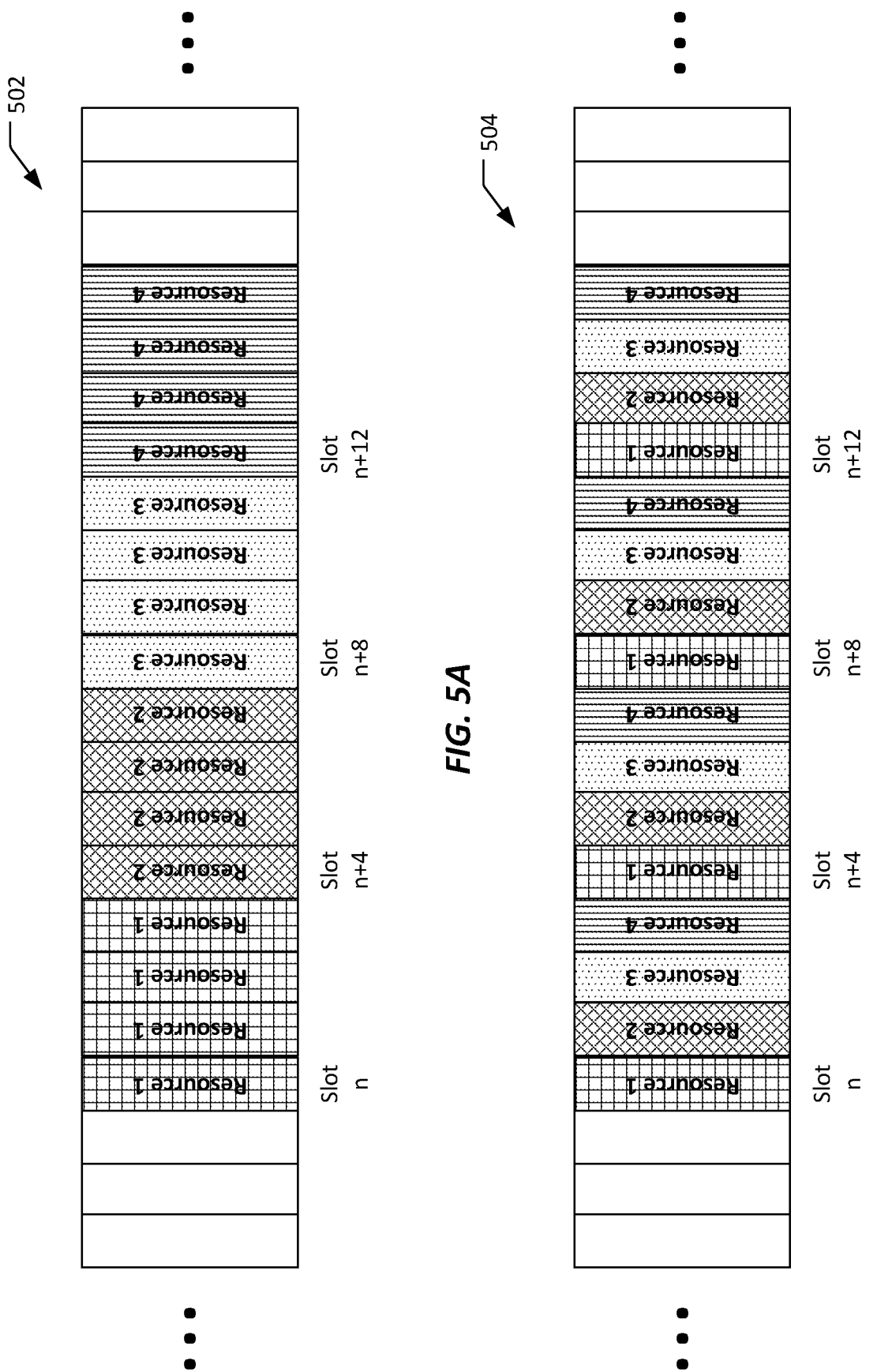
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
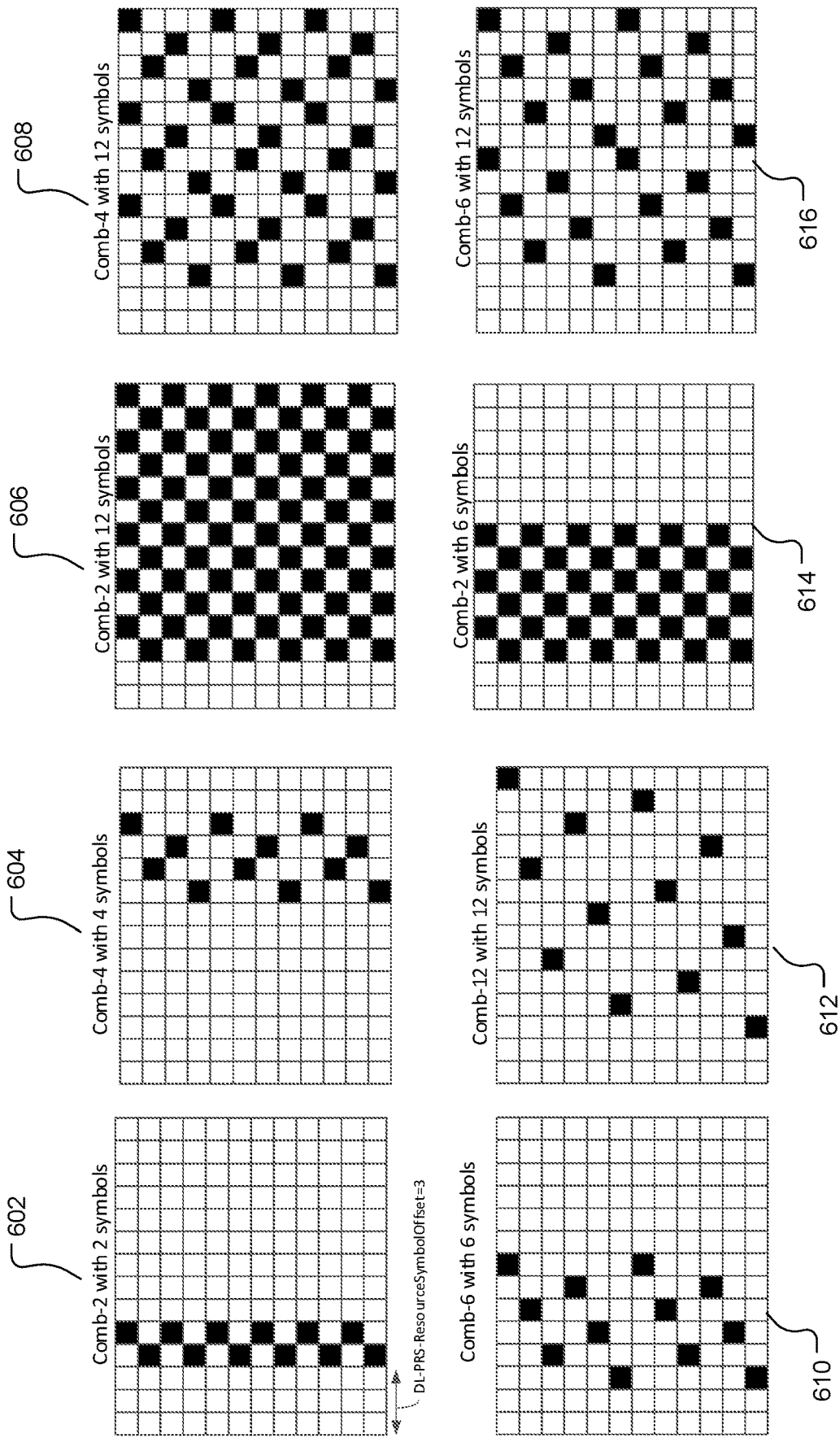
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
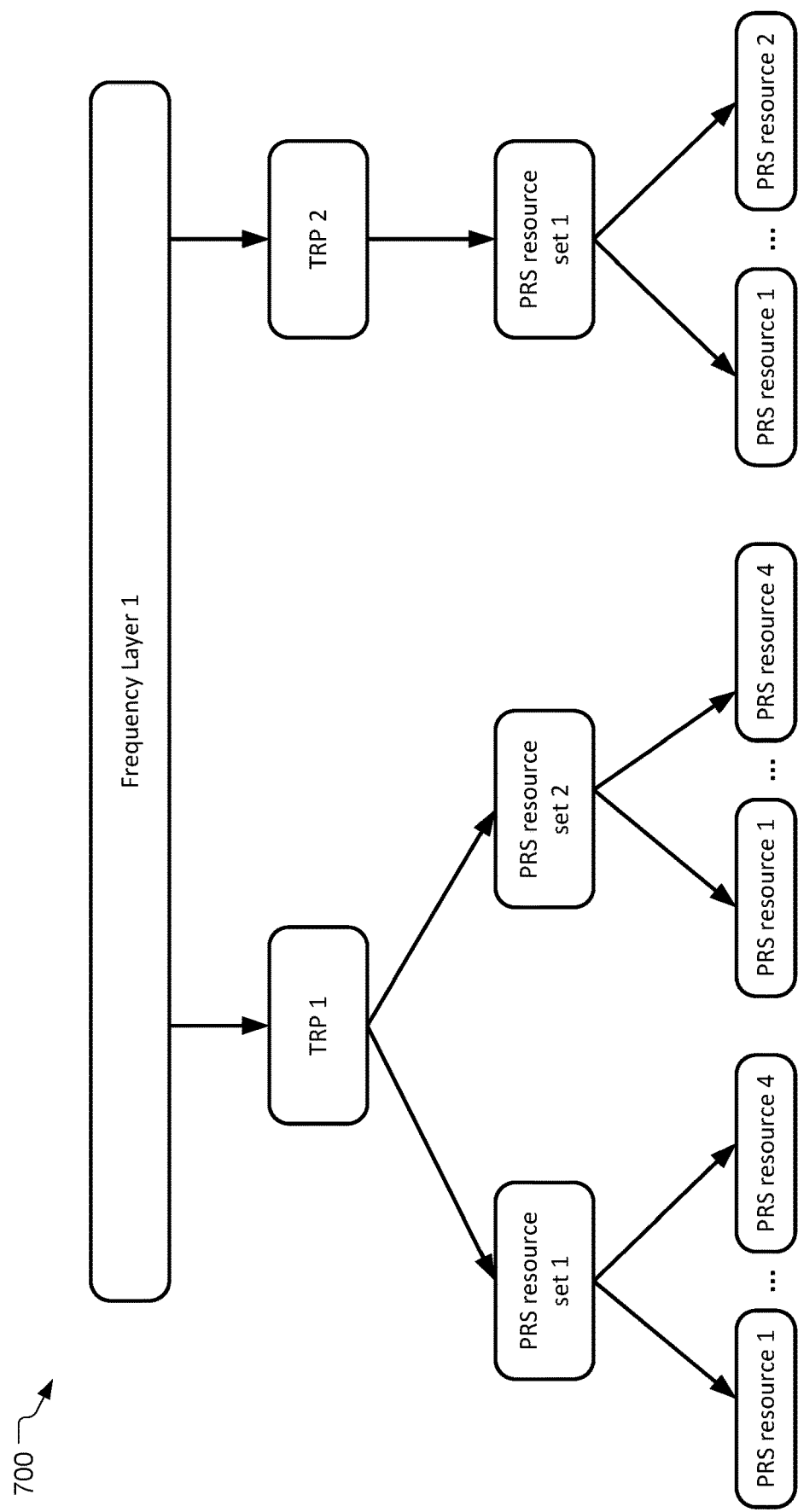
FIG. 7 is a conceptual diagram of an example frequency layer.

Referring to FIG. 7, a conceptual diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
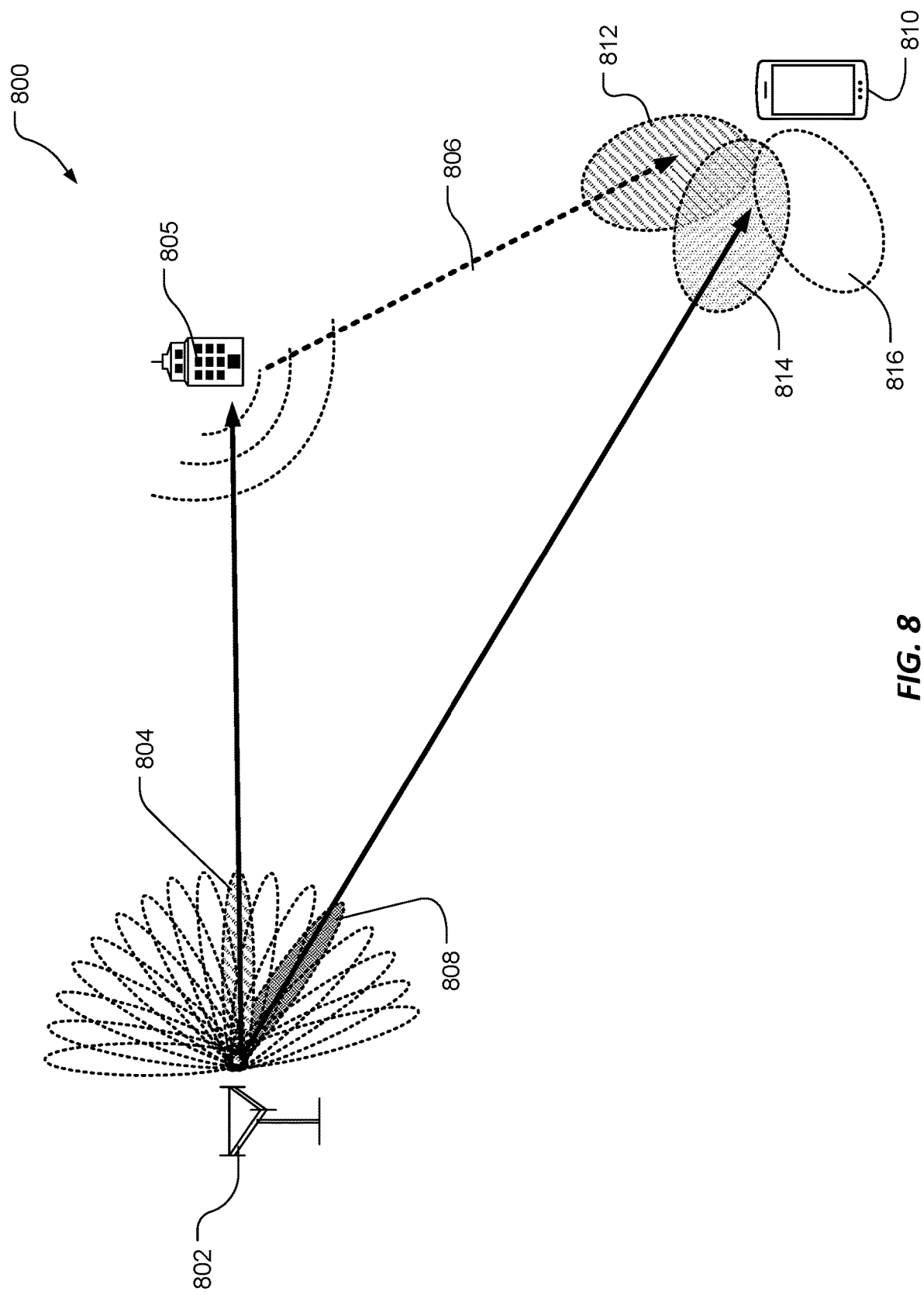
FIG. 8 is a conceptual diagram of example downlink and uplink beam pairings.

Referring to FIG. 8, a conceptual diagram 800 of example downlink and uplink beam pairings is shown. The diagram 800 includes a base station 802, such as a 5G NR gNB configured to transmit a plurality of beamformed signals along different azimuths and/or elevations, and a UE 810 configured to utilize receive beamforming to improve the gain of signals based on the angle of arrival. The base station 802 may be configured to generate N different reference beams and various azimuths, elevations, and/or beam widths. In an example the beams transmitted by the base station 802 may be based on SS Blocks, CSI-RS, TRS, or PRS resource sets. Other sensing and tracking reference signals may also be used. The UE 810 may be configured to utilize phase shifters and other software and hardware techniques to generate receive beams such as a first receive beam 812, a second receive beam 814, and a third receive beam 816. The UE 810 may also be configured to utilize beam forming for transmitted beams. The base station 802 may transmit a first reference signal 804 in the direction of a target object, such as the building 805, which may be reflected and the UE 810 may receive a reflected signal 806 with the first receive beam 812. The reflected signal 806 represents a NLOS path of the first reference signal 804 to the UE 810. The base station 802 also transmits a second reference signal 808 on a second beam. The UE 810 receives the second reference signal 808 with the second receive beam 814. The second reference signal 808 is a LOS path to the UE 810. While the LOS path is preferred for some positioning applications, some positioning applications may use NLOS paths based on the location of known reflectors such as the building 805.

In operation, the UE 810 may be configured to report the channel responses for each of the first and second reference signals 804, 808 to the base station 802 or another serving cell, and the base station 802 may be configured to manage the transmit beam and receive beam pairs for positioning methods. For example, the base station 802 may be configured to determine that the beam pair including the second reference signal 808 and the second receive beam 814 are a LOS path (e.g., based on fastest time of flight measurement) and then use the beam pair for ToA, RTT, RSTD, AoA, AoD or other ranging techniques. The beam identification information associated with the beam pairs may be a transmission configuration indicator (TCI) sent in a DCI message which includes configurations such as QCL relationships between the transmit and receive beams.

In an example, the latency associated with determining the LOS beam pairs between multiple base stations and the UE 810 may increase because each base station may iterate through their respective DL beam transmissions as the UE 810 iterates through different receive beams. The UL assisted techniques provided herein may be used to reduce this latency and messaging overhead.

Figure 9:
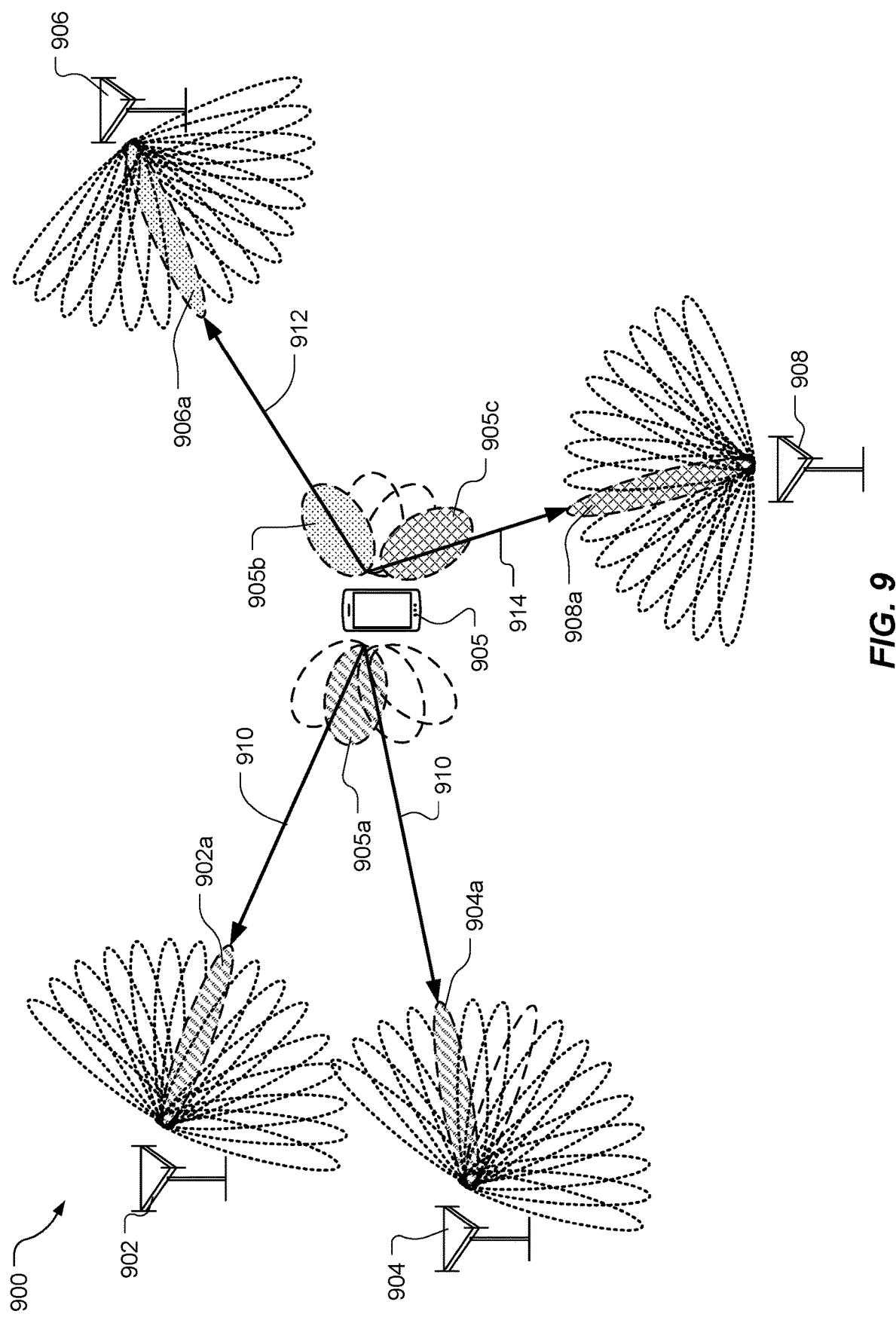
FIG. 9 is a conceptual diagram of example uplink positioning reference signal transmissions.

Referring to FIG. 9, a conceptual diagram 900 of example uplink positioning reference signals is shown. The diagram 900 includes a UE 905, which may include some or all of the components of the UE 200 which may be an example of the UE 905 and is configured to transmit a plurality of beamformed signals, such as UL PRS, along different azimuths and/or elevations. A plurality of base stations, such as a 5G NR gNB, including a first base station 902, a second base station 904, a third base station 906, and a fourth base station 908 are configured to utilize receive beamforming to determine the gain of received signals as well as the angle of arrival (AoA) of the signals. The base stations 902, 904, 906, 908 may include some or all of the components of the TRP 300, which may be an example of one, some or all of the base stations 902, 904, 906, 908. In operation, the UE 905 may transmit a first UL PRS 910 in a first beam 905a (i.e., a first PRS resource), second UL PRS 912 in a second beam 905b (i.e., a second PRS resource), and a third UL PRS 914 in a third beam 905c (i.e., a third PRS resource). The first base station 902 may determine a first AoA of the first UL PRS 910 based on a first receive beam 902a, and the second base station 904 may determine a second AoA of the first UL PRS 910 based on a second receive beam 904a. That is, both the first and second base stations 902, 904 may receive the first UL PRS 910. The third base station 906 may determine an AoA of the second UL PRS 912 based on a receive beam 906a. The fourth base station 908 may determine an AoA of the third UL PRS 914 based on a receive beam 908a. The UE 905 may be configured to transmit the UL PRS with or without repetitions and may use the same or different transmit beams. In an example, the UE 905 may be configured to provide assistance data including the beam and PRS configuration information to a network server (e.g., the LMF 120) and/or the base stations. Each of the base stations 902, 904, 906, 908 may report the respective AoA, timing and signal strength measurements to a network server, such as the LMF 120 (not shown in FIG. 9). The network server may be configured to provide DL PRS configuration information to the UE 905 and the base stations 902, 904, 906, 908 based at least in part on the received UL PRS AoA, timing and signal strength information. For example, the LMF 120 may utilize network protocols such as NRPPa and LPP to provide the DL PRS configuration information to the gNBs and UEs, respectively. The DL PRS configuration information may be configured to assign the beam pairs between the UE 905 and the respective base stations 902, 904, 906, 908 for the DL PRS transmissions. For example, beam 902a on the first base station 902 and beam 905a on the UE 905 are an example beam pair, beam 904*a* on the second base station 904 and beam 905*a* on the UE 905 are an example beam pair, beam 906*a* on the third base station 906 and beam 905*b* on the UE 905 are an example beam pair, and beam 908*a* on the fourth base station 908 and beam 905*c* on the UE 905 are an example beam pair.

In an embodiment, the UL PRS 910, 912, 914 and the subsequent DL PRS may be within the same, or in different frequency bands. If in the same frequency band, a QCL or spatial relationship may be defined directly between receive beams with UL PRS and a transmit beam with DL-PRS at the base station side. In an example, the receive beam with DL PRS may be QCLed with the a transmit beam with UL PRS at the UE side. In general, if the UL PRS and the DL PRS will be in different bands, the UL PRS may utilize a lower band than the DL PRS. Utilizing a lower band for the UL PRS may provide advantages in that the pathloss for the lower frequency may be less than at higher frequencies, and thus the UL PRS may enable improved signal to noise ratios (SINR). The angle estimation may be improved with more digital beamforming as compared to analog beamforming. Using different bands may eliminate reciprocal DL/UL channels. The AoA measurements obtained in the lower band may provide insight for the DL PRS beam in the higher band. A base station may be configured to recommend the use of a higher band DL PRS to the network server.

Figure 10:
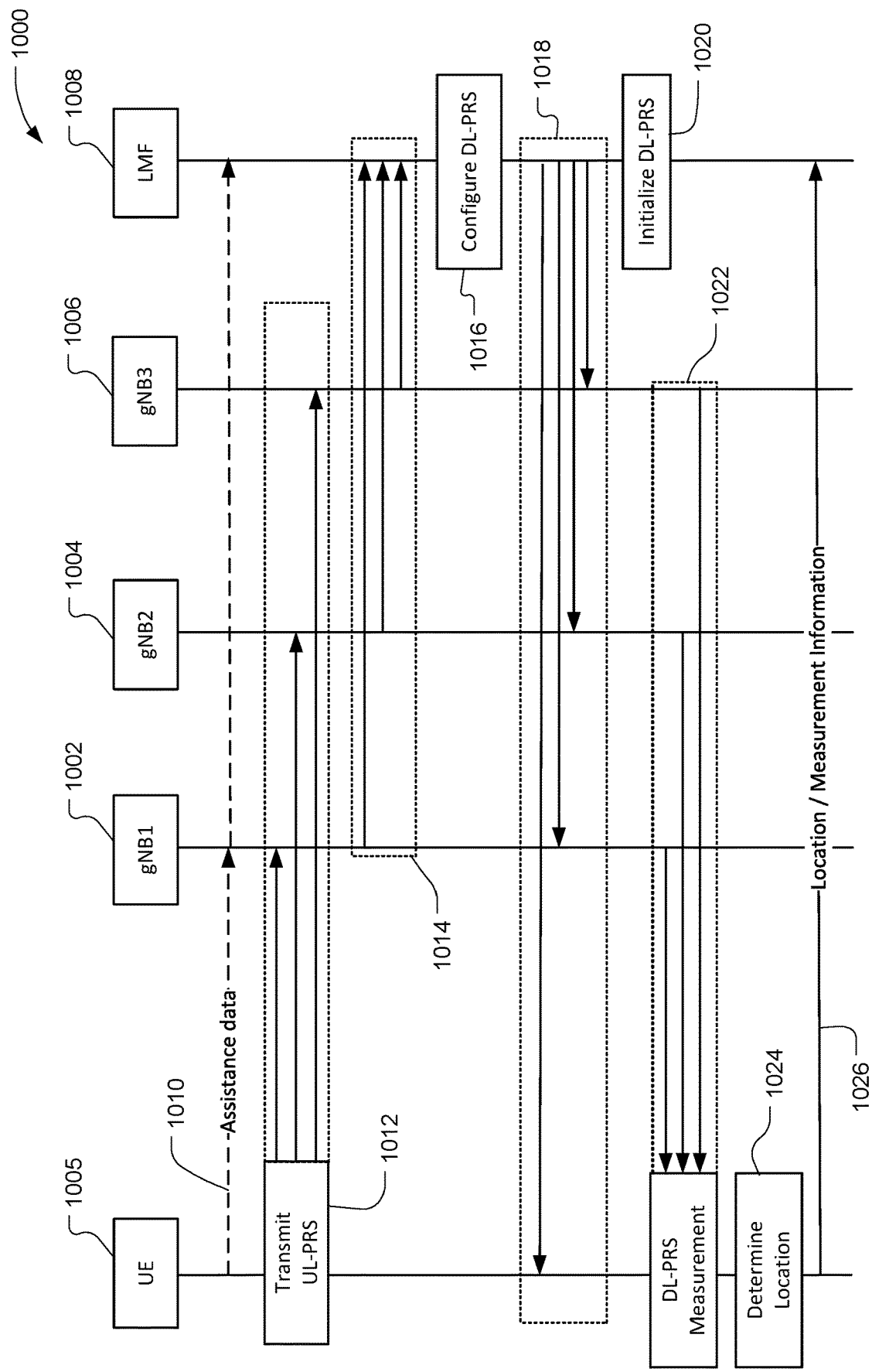
FIG. 10 is an example message flow for uplink assisted positioning reference signal beam management.

Referring to FIG. 10, an example message flow 1000 for uplink assisted positioning reference signal beam management is shown. The message flow 1000 may be based on the communication system 100 and includes a UE 1005, a first base station 1002, a second base station 1004, and a third base station 1006. The UE 1005 and base stations 1002, 1004, 1006 are configured to communicate with a network server such as a LMF 1008. The UE 1005 may include some of the components of the UE 200, and the UE 200 may be an example of the UE 1005. The base stations 1002, 1004, 1006 may include some of the components of the TRP 300, and the TRP 300 may be an example of a base station. The LMF 1008 may include components of the network server 400 such as the LMF 120. In general, the message flow 1000 may be used to enable uplink assisted positioning reference signal beam management. The message flow 1000 is an example, and not a limitation as variations on messages, information elements, and action sequences may be used to provide uplink assistance reference signal beam management.

In operation, in an example, the UE 1005 may be configured to provide one or more optional assistance data messages 1010 configured to include UL PRS beam information to the network (e.g., via a serving cell). The one or more assistance data messages 1010 may utilize wireless protocols such as LPP, RRC, or other signaling methods. The UL PRS may be considered a type of SRS and may be transmitted with different transmit beams. The beam information in the assistance data messages 1010 may be used to describe UE transmitted beam parameters such as boresight angle, beamwidth, beam shape, E-field, and other beam parameters to define transmissions from the UE. The boresight angle may be based on true or magnetic heading information provided by the IMU 270 (e.g., magnetometers 271 and/or the gyroscope 274). In an example, the UE beam information may be included in general assistance data or embedded into assistance data for the UL PRS. For example, the beam information may be included in network data, such as the SRS-SpatialRelationInfoPos object.

At stage 1012, the UE 1005 is configured to transmit one or more UL PRS signals. The UL PRS may be transmitted with our without repetitions and with the same or different transmit beams. The UL PRS beams may conform to the beam information in the assistance data. The base stations 1002, 1004, 1006 are configured to measure the UL PRS and determine AoA, timing and signal strength information. At stage 1014, the base stations 1002, 1004, 1006 are configured to report their respective UL PRS measurement information to the LMF 1008, or another network entity. In an example, the UL PRS measurement information may be provided via network protocols such as NRPPa messaging.

At stage 1016, the LMF 1008 may configure the DL PRS based on the UL PRS measurement information provided by the base stations. In an example, the LMF 1008 may be configured to perform an outlier procedure on the UL PRS measurement information to remove or reduce the significance of incompatible receive beam options of certain base stations. The LMF 1008 may be configured to schedule or reschedule DL PRS based on the received measurement information. For example, multiple DL PRS may be transmitted from the same gNB with different TRPs. The LMF 120 may be configured to perform other optimizations such as selection TDM/FDM patterns for the DL PRS, assign or reassign a reference cell, etc. The DL PRS may utilize a different frequency layer than the UL PRS transmitted at stage 1012. In an example, the LMF 1008 may be configured to utilize the beam information provided in the assistance data messages 1010 to schedule the DL PRS. For example, the beam information may be used for outlier rejection and scheduling. At stage 1018, the LMF 1008 may provide DL PRS configuration information to the network stations via NRPP/NRPPa and LPP/LPPa messages. The network stations may be wireless nodes such as base stations 1002, 1004, 1006 and the UE 1005. As examples, and not limitations, the LMF 1008 may provide DL PRS assistance data (e.g., NR-DL-PRS-AssistanceDataPerTRP) which may include information elements configured to modify the DL PRS resources such as the PRS repetition factor, the DL PRS resource time gap, the muting options (e.g., muting pattern(s)), the DL PRS comb size, and the DL PRS QCL information. The DL PRS assistance data may include additional information, such as station location and beam AoD information, to enable a UE to perform positioning calculations based on the assistance data and measurements of the DL PRS transmissions.

At stage 1020, the LMF 1008 may be configured to initialize the DL PRS procedure based on the configuration determined at stage 1016. In an example, the DL PRS procedure may be initialized based on an on-demand PRS request received by a station from the UE 1005. At stage 1022, the base stations 1002, 1004, 1006 are configured to transmit the scheduled DL PRS and the UE 1005 may obtain measurements such as ToA, RSTD, AoA, etc. based on the DL PRS. The DL PRS transmitted at stage 1022 may be in a different frequency band than the UL PRS transmitted at stage 1012. At stage 1024, in a UE based positioning approach, the UE 1005 may be configured to perform positioning computations based on the measurements and other assistance data. For example, the UE 1005 may determine a range to a station based on the ToA (e.g., Distance=time*speed of light). Multilateration may be used to determine the location of the UE 1005 based on ranges to multiple stations. In an example, the UE 1005 may be configured to provide the measurement values obtained at stage 1022 to a network server, such as the LMF 1008, and the network server may be configured to compute the location of the UE 1005. One or more location/measurement messages 1026 may be provided to the LMF 1008 and configured to include location and/or DL PRS measurement information.

Figure 11A:
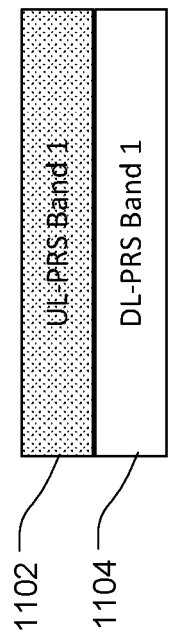
FIGS. 11A-11C are example bandwidth comparisons for uplink and downlink positioning reference signals.
Figure 11B:
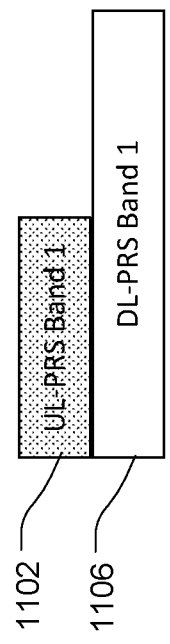
Figure 11C:
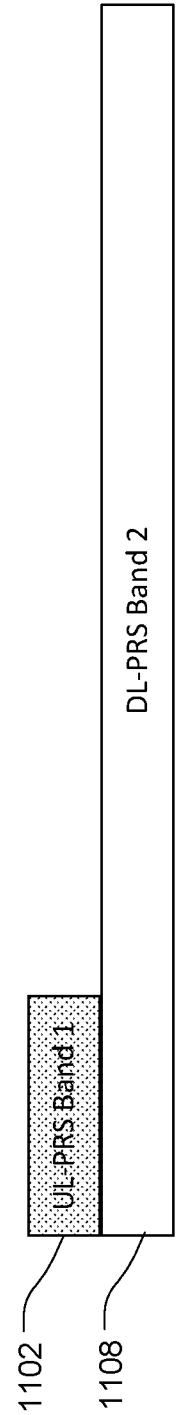

Referring to FIGS. 11A-11C, example bandwidth comparisons for uplink and downlink positioning reference signals are shown. The bandwidth comparisons are conceptual examples and not limitations. In general, a UE may have reduced power and beam forming capabilities as compared to a base station. The power limitation may also include using a reduce bandwidth for the UL PRS transmissions. FIG. 11A depicts a first example where the UL and DL PRS utilize the same frequency band, and a UL PRS bandwidth 1102 and a first DL PRS bandwidth 1104 are the same. FIG. 11B depicts a second example where the UL and DL PRS utilize the same frequency band, but a second DL PRS bandwidth 1106 is larger than the UL PRS bandwidth 1102. FIG. 11C depicts a third example where the UL and DL PRS utilize different frequency bands and a third DL PRS bandwidth 1108 is larger than the UL PRS bandwidth 1102. For example, the second frequency band (Band 2) may be at a higher frequency than the first frequency band (Band 1) and the DL PRS resources may occupy a significantly larger bandwidth. The relatively smaller UL PRS bandwidth is sufficient for the receiving base stations to determine the AoA of the UL PRS. The smaller bandwidth of the UL PRS may provide advantages such as improved power management, and improved SNR (i.e., the transmit power is distributed over a smaller bandwidth).

Figure 12:
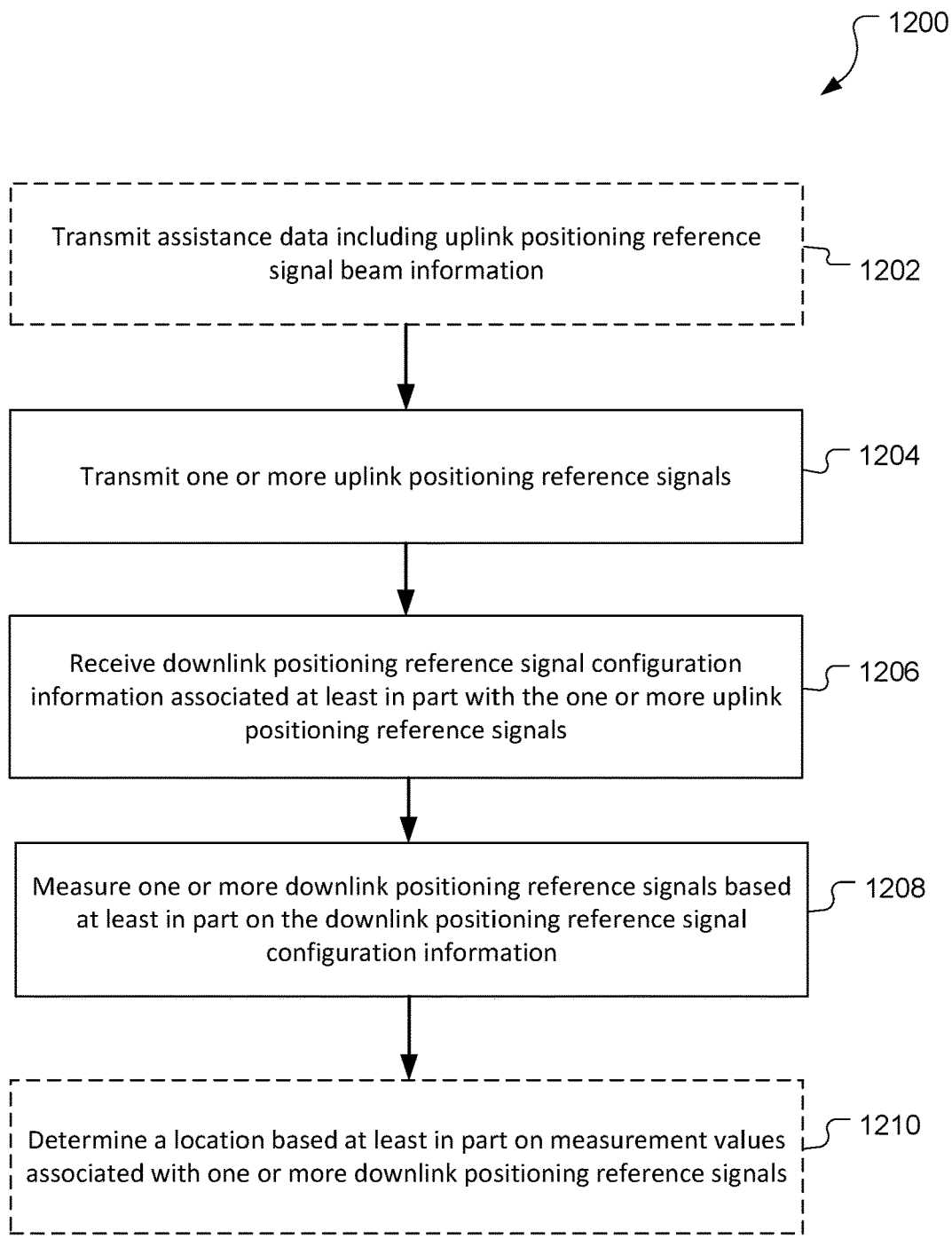
FIG. 12 is a process flow for an example method performed at a user equipment for uplink assisted positioning reference signal beam management.

Referring to FIG. 12, with further reference to FIGS. 1-11C, a method 1200 performed at a user equipment for uplink assisted positioning reference signal beam management includes the stages shown. The method 1200 is, however, an example and not limiting. The method 1200 may be altered, e.g., by having stages added, removed, rearranged, combined, performed concurrently, and/or having single stages split into multiple stages. For example, transmitting assistance data at stage 1202 and determining a location at stage 1210 are optional, or may be combined with other stages.

At stage 1202, the method optionally includes transmitting assistance data including uplink positioning reference signal beam information. A UE 200, including the processor 230 and transceiver 215, is a means for transmitting assistance data. In an embodiment, a UE such as the UE 1005 may be configured to provide one or more optional assistance data messages 1010 configured to include UL PRS beam information to a base station (e.g., gNB) and/or a network server (e.g., LMF). The one or more assistance data messages 1010 may utilize wireless protocols such as LPP, RRC, or other signaling methods. The beam information may be used to describe UE transmitted beam parameters such as boresight angle, beamwidth, beam shape, E-field, and other beam parameters to define transmissions from the UE. In operation, a network server may utilize the UL PRS beam information for providing DL PRS. For example, the UL PRS beam information may be used for outlier rejection and DL PRS scheduling.

At stage 1204, the method includes transmitting one or more uplink positioning reference signals. The UE 200, including the processor 230 and transceiver 215, is a means for transmitting UL PRS. In an embodiment, referring to FIG. 9, the UE 905 may transmit a first UL PRS 910 in a first beam 905a, a second UL PRS 912 in a second beam 905b, and a third UL PRS 914 in a third beam 905c. In an example, the bandwidth of the UL PRS may be reduced to improve the power spectral density (PSD) of the UL PRS. The first base station 902 and the second base station 904 may determine respective AoAs of the first UL PRS 910. The third base station 906 may determine an AoA of the second UL PRS 912, and the fourth base station 908 may determine an AoA of the third UL PRS 914. The UE 905 may be configured to transmit the UL PRS with or without repetitions and may use the same or different transmit beams. The UL PRS may be provided periodically or via a semi-persistent methodology. In an example, the UL PRS may be triggered by a network entity, such as the gNB, via signaling methods such as Downlink Control Information (DCI) and Media Access Control (MAC) Control Element (CE) messages.

At stage 1206, the method includes receiving downlink positioning reference signal configuration information associated at least in part with the one or more uplink positioning reference signals. The UE 200, including the processor 230 and transceiver 215, is a means for receiving the DL PRS configuration information. In operation, a network server (e.g., the LMF 120) may be configured to provide DL PRS configuration information to the UE based at least in part on UL PRS AoA, timing and signal strength information associated with the UL PRS transmitted at stage 1204 and reported by one or more base stations. In an example, the LMF 120 may utilize network protocols such as LPPa to provide the DL PRS configuration information to the UE 200. In general, the DL PRS configuration information may assign the beam pairs between the UE 905 and the respective base stations 902, 904, 906, 908 for the DL PRS transmissions. The LMF 120 may provide DL PRS configuration information to the network stations, such as the base stations and UE, via NRPP/NRPPa and LPP/LPPa assistance data messages. For example, DL PRS assistance data (e.g., NR-DL-PRS-AssistanceDataPerTRP) which may include information elements configured to modify the DL PRS resources such as the PRS repetition factor, the DL PRS resource time gap, the muting options, the DL PRS comb size, and the DL PRS QCL information based at least in part on the measurements of the UL PRS transmitted at stage 1204. The DL PRS assistance data may include additional beam and positioning information.

At stage 1208, the method includes measuring one or more downlink positioning reference signals based at least in part on the downlink positioning reference signal configuration information. The UE 200, including the processor 230 and transceiver 215, is a means for measuring the DL PRS. In an embodiment the DL PRS may be within the same or different frequency bands as the UL PRS transmitted at stage 1204. If in the same frequency band, a QCL or spatial relationship may be defined directly between received beams with UL PRS and a transmit beam with DL-PRS at the base station side. In an example, the receive beam with DL PRS may be QCLed with the a transmit beam with UL PRS at the UE side. Base stations in the communication network, such as the base station 1002, 1004, 1006 in FIG. 10, are configured to transmit the DL PRS based on the DL PRS configuration information, and the UE may obtain measurements such as ToA, RSRP, RSTD, AoA, etc. based on the transmitted DL PRS. In an embodiment, the UE may provide the measurement values to the LMF 120, or another network entity, and the LMF 120 may be configured to determine a location of the UE based on the measurements and locations of the base stations (e.g., multilateration). Other measurements, such as RSSI, E-CID and AoA and AoD (from the base stations) may also be used to determine the location of the UE.

At stage 1210, the method optionally includes determining a location based at least in part on measurement values associated with one or more downlink positioning reference signals. The UE 200, including the processor 230, and a server 400, including the processor 410, are means for determining the location of the UE. In an example, the UE 200 may be configured to receive positioning assistance data including station location information and the UE 200 may be configured to compute a location based on the measurements obtained at stage 1208. The UE 200 may report the computed location to a network server such as the LMF 120. In an example, the UE 200 may report the measurements obtained to a network server and the network server may be configure to compute a location of the UE.

Figure 13:
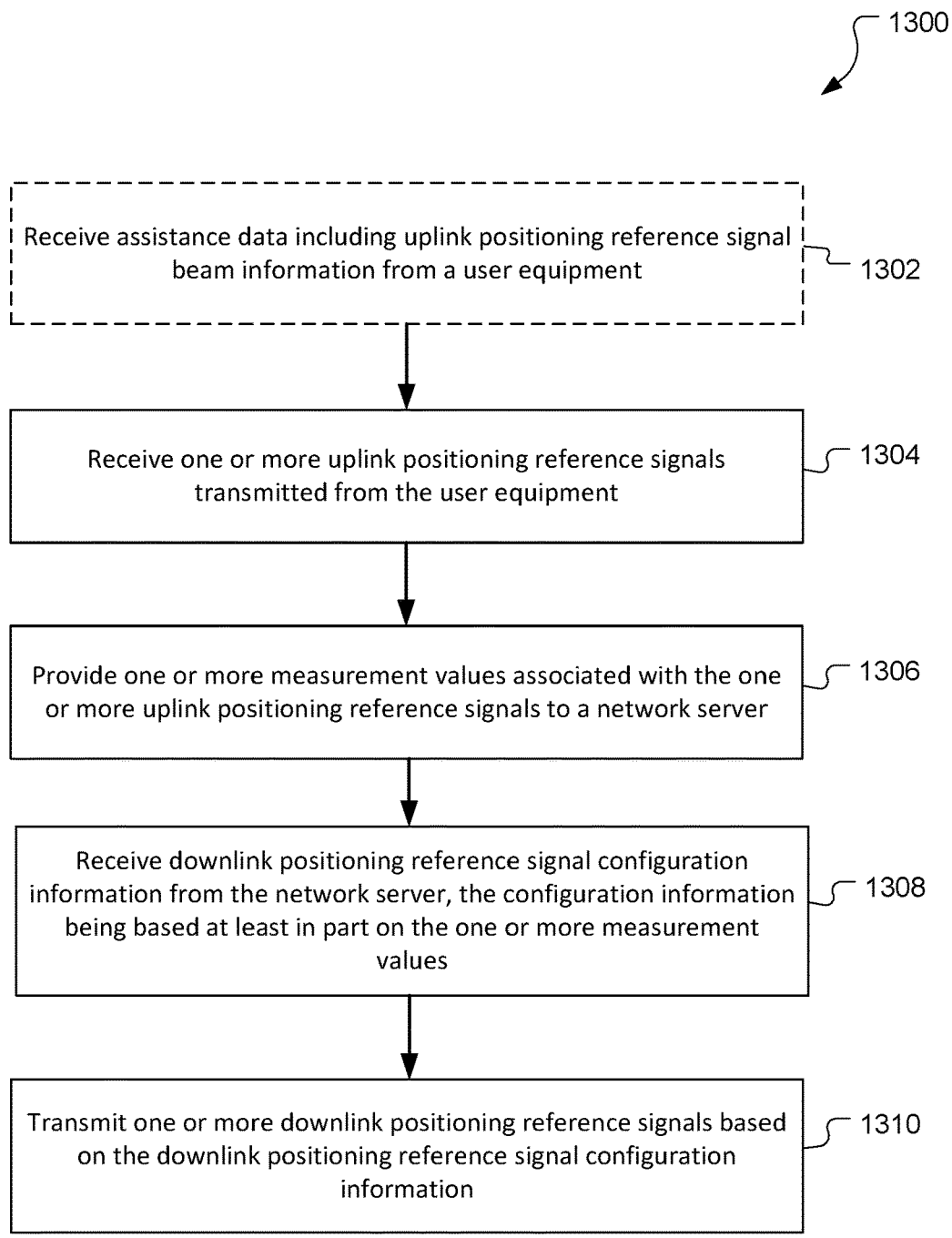
FIG. 13 is a process flow for an example method performed at a base station for uplink assisted positioning reference signal beam management.

Referring to FIG. 13, with further reference to FIGS. 1-11C, a method 1300 performed at a base station for uplink assisted positioning reference signal beam management includes the stages shown. The method 1300 is, however, an example and not limiting. The method 1300 may be altered, e.g., by having stages added, removed, rearranged, combined, performed concurrently, and/or having single stages split into multiple stages. For example, receiving assistance data at stage 1302 is optional, or may be combined with other stages, and stage 1308 is optional as.

At stage 1302, the method optionally includes receiving assistance data including uplink positioning reference signal beam information from a user equipment. The TRP 300, including the processor 310 and the transceiver 315, is a means for receiving assistance data. In an embodiment, a UE may be configured to provide one or more optional assistance data messages configured to include UL PRS beam information to the base station (e.g., gNB) and/or a network server (e.g., LMF). The one or more assistance data messages may utilize wireless protocols such as LPP, RRC, or other signaling methods. The beam information may be used to describe UE transmitted beam parameters such as boresight angle, beamwidth, beam shape, E-field, and other beam parameters to define transmissions from the UE. In operation, a network server may utilize the UL PRS beam information for providing DL PRS. For example, the UL PRS beam information may be used for outlier rejection and DL PRS scheduling.

At stage 1304, the method includes receiving one or more uplink positioning reference signals transmitted from the user equipment. The TRP 300, including the processor 310 and the transceiver 315, is a means for receiving the UL PRS. The UE is configured to transmit one or more UL PRS signals. The UL PRS may be transmitted with our without repetitions and with the same or different transmit beams. In an embodiment, the UL PRS beams may conform to the beam information in the assistance data. A base station is configured to measure the UL PRS and determine AoA, timing and signal strength information for each received UL PRS. In an example, the base station may be configured to send one or more signals (e.g., DCI, MAC-CE) configured to trigger the UE to transmit one or more UL PRS.

At stage 1306, the method includes providing one or more measurement values associated with the one or more uplink positioning reference signals to a network server. The TRP 300, including the processor 310 and the transceiver 315, is a means for providing the measurement values. The base station is configure to report the UL PRS measurement information such as the AoA, timing and signal strength information to the network entity, such as the LMF 120. In an example, the UL PRS measurement information may be provided via network protocols such as NRPPa messaging.

At stage 1308, the method includes receiving downlink positioning reference signal configuration information from the network server, the configuration information being based at least in part on the one or more measurement values. The TRP 300, including the processor 310 and the transceiver 315, is a means for receiving the DL PRS configuration information. In an embodiment, the network server (e.g., the LMF 120) is configured to schedule DL PRS based on the UL PRS measurement information provided by the base stations at stage 1306. The network server may be configured to schedule or reschedule DL PRS based on the received measurement information and the corresponding beam pairs. For example, multiple DL PRS may be transmitted from the same gNB with different TRPs. The network server may be configured to select TDM/FDM patterns for the DL PRS, assign or reassign a reference cell, etc. The DL PRS may utilize a different frequency layer than the UL PRS received at stage 1304. The network server may provide DL PRS configuration information to the base stations via NRPP/NRPPa messages, or via other network communication protocols. The network server may provide the DL PRS configuration information to a UE via LPP/LPPa, or other network communication protocols (e.g., RRC). As examples, and not limitations, the network server may provide DL PRS assistance data (e.g., NR-DL-PRS-AssistanceDataPerTRP) which may include information elements configured to modify the DL PRS resources such as the PRS repetition factor, the DL PRS resource time gap, the muting options, the DL PRS comb size, and the DL PRS QCL information.

In an embodiment, the LMF 120 may provide the DL PRS configuration information to a specific UE and one or more gNBs may transmit DL PRS based on previous DL PRS configuration information. For example, in a periodic DL PRS scheme, a gNB may broadcast 4 DL PRS with four beams. The LMF 120 may not change the DL PRS configuration on the gNB because the previous DL PRS configurations may be useful to other UEs in the coverage area of the gNB. The LMF 120 may configure the DL PRS at the UE side and indicate which receive beams the UE should use.

At stage 1310, the method includes transmitting one or more downlink positioning reference signals based on the downlink positioning reference signal configuration information. The TRP 300, including the processor 310 and the transceiver 315, is a means for transmitting one or more DL PRS. In general, the base station is configured to transmit the scheduled DL PRS based on the configuration information received at stage 1308, and one or more UEs may obtain measurements such as ToA, RSTD, AoA, etc. based on the DL PRS. In an embodiment, the base station may be configured to provide assistance data including station location information to enable the receiving UEs to perform positioning computations locally.

Figure 14:
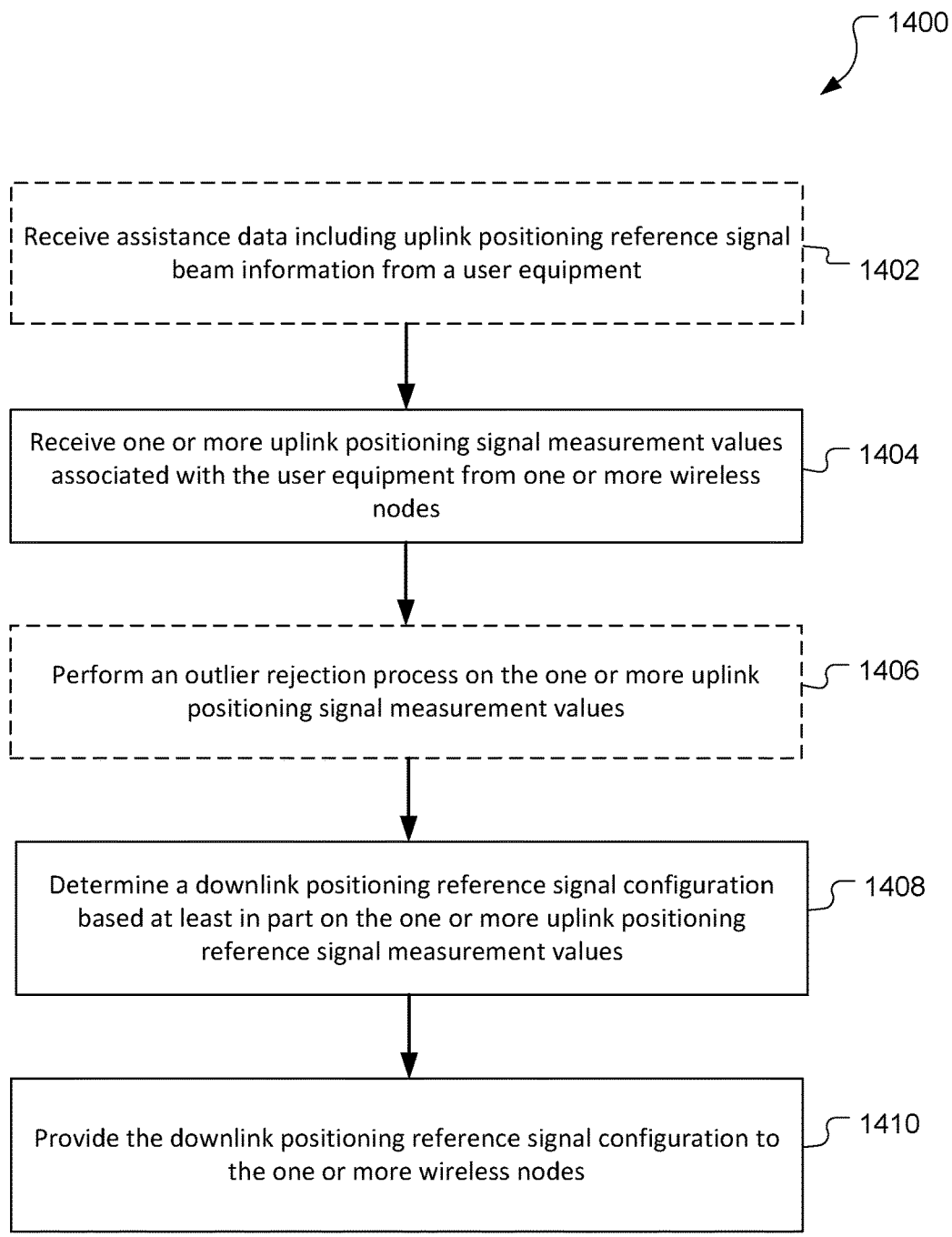
FIG. 14 is a process flow for an example method performed at a network server for uplink assisted positioning reference signal beam management.

Referring to FIG. 14, with further reference to FIGS. 1-11C, a method 1400 performed at a network server for uplink assisted positioning reference signal beam management includes the stages shown. The method 1400 is, however, an example and not limiting. The method 1400 may be altered, e.g., by having stages added, removed, rearranged, combined, performed concurrently, and/or having single stages split into multiple stages. For example, receiving assistance data at stage 1402 and performing outlier rejection at stage 1406 are optional, or may be combined with other stages.

At stage 1402, the method optionally includes receiving assistance data including uplink positioning reference signal beam information from a user equipment. A server 400, including the processor 410 and the transceiver 415, is a means for receiving assistance data. In an embodiment, a UE may be configured to provide one or more optional assistance data messages configured to include UL PRS beam information to a wireless node such as a base station (e.g., gNB) and/or a network server. The one or more assistance data messages may utilize wireless protocols such as LPP, RRC, or other signaling methods. The beam information may be used to describe UE transmitted beam parameters such as boresight angle, beamwidth, beam shape, E-field, and other beam parameters to define transmissions from the UE. In operation, the network server (e.g., LMF 120) may utilize the UL PRS beam information for providing DL PRS. For example, the UL PRS beam information may be used for outlier rejection and DL PRS scheduling.

At stage 1404, the method includes receiving one or more uplink positioning reference signals measurement values associated with the user equipment from a one or more wireless nodes. transmitted from the user equipment. The server 400, including the processor 410 and the transceiver 415, is a means for receiving the UL PRS measurement values. A UE is configured to transmit one or more UL PRS signals which are received and measured by the one or more wireless nodes. A wireless node may be a base station such as the gNBs 110*a-b*, ng-eNB 114, or other wireless stations such as the UE 200. In an example a UE may be configured to perform as a base station (e.g., in a sidelink based network). The UL PRS may be transmitted with our without repetitions and with the same or different transmit beams. In an embodiment, the UL PRS beams may conform to the beam information in the assistance data. Each of the one or more wireless nodes are configured to measure the UL PRS and determine AoA, timing and signal strength values for each received UL PRS, and then report the UL PRS measurement value information the network server. In an example, the UL PRS measurement values may be provided via network protocols such as NRPPa messaging.

At stage 1406, the method may optionally include performing an outlier rejection process on the one or more uplink positioning measurement values. The server 400, including the processor 410 and the memory 411, is a means for performing an outlier rejection process. In an example, the network server may be configured to combine all of the UL PRS measurement values received from the one or more wireless nodes and exclude or diminish (e.g., assign a lower weight) to the measurement values that outside one or two standard deviations of the data set. For example, timing synchronization errors, obstructed signals or multipath errors may cause the measurement values associated with a UL PRS to be outside of an expected distribution. The state of the transmitting UE may also impact the viability of UL PRS or the ability to receive one or more DL PRS. For example, if the mobile device is in use (e.g., near a user's body) certain antennas or power settings may be altered to reduce the potential of radiation to the user. The network server may be configured to remove DL PRS associated with the outliers from the DL PRS configuration.

At stage 1408, the method includes determining a downlink positioning reference signal configuration based at least in part on the one or more uplink positioning reference signal measurement values. The server 400, including the processor 410 and the memory 411, is a means for determining the DL PRS configuration. In an embodiment, the network server (e.g., the LMF 120) is configured to schedule DL PRS based on the UL PRS measurement information, including the beam pair information, received from the one or more wireless nodes at stage 1404. The network server may be configured to schedule or reschedule DL PRS based on the received measurement information. For example, multiple DL PRS may be transmitted from the same gNB with different TRPs. The network server may be configured to select TDM/FDM patterns for the DL PRS, assign or reassign a reference cell, etc. The DL PRS may utilize a different frequency layer than the UL PRS reported by the wireless node at stage 1404. In an example, the DL PRS configuration may include at least one of a repetition factor, a resource time gap, a muting pattern, a comb size, or quasi co-location (QCL) information.

At stage 1410, the method includes providing the downlink positioning reference signal configuration to the one or more wireless nodes. The server 400, including the processor 410 and the transceiver 415, is a means for providing the DL PRS configuration. In an example, the network server may provide the DL PRS configuration to the wireless nodes via NRPP/NRPPa messages, or via other network communication protocols. In an embodiment the DL PRS configuration may include DL PRS assistance data (e.g., NR-DL-PRS-AssistanceDataPerTRP) which may include information elements configured to modify the DL PRS resources such as the PRS repetition factor, the DL PRS resource time gap, the muting options, the DL PRS comb size, and the DL PRS QCL information.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of measuring downlink positioning reference signals, comprising:
   transmitting one or more uplink positioning reference signals;
   receiving downlink positioning reference signal configuration information associated at least in part with the one or more uplink positioning reference signals; and
   measuring one or more downlink positioning reference signals based at least in part on the downlink positioning reference signal configuration information.

2. The method of clause 1 further comprising determining a location based at least in part on measurement values associated with the one or more downlink positioning reference signals.

3. The method of either of clauses 1 or 2 further comprising transmitting assistance data including uplink positioning reference signal beam information.

4. The method of any of clauses 1-3 wherein measuring the one or more downlink positioning reference signals includes determining at least one of a time of arrival or a reference signal received power (RSRP) for at least one downlink positioning reference signal.

5. The method of any of clauses 1-4 wherein measuring the one or more downlink positioning reference signals includes determining a time difference of arrival for at least two or more downlink positioning reference signals.

6. The method of any of clauses 1-5 wherein the one or more uplink positioning reference signals utilize a first bandwidth and the one or more downlink positioning reference signals utilize a second bandwidth that is different from the first bandwidth.

7. The method of clause 6 wherein the first bandwidth is less than the second bandwidth.

8. The method of any of clauses 1-7 wherein the one or more uplink positioning reference signals utilize a first frequency layer and the one or more downlink positioning reference signals utilize a second frequency layer that is different from the first frequency layer.

9. The method of any of clauses 1-8 wherein the one or more downlink positioning reference signals are quasi co-located with the one or more uplink positioning reference signals.

10. The method of any of clauses 1-9 wherein the downlink positioning reference signal configuration information includes at least one of a repetition factor, a resource time gap, a muting pattern, a comb size, or quasi co-location (QCL) information.

11. A method of providing downlink positioning reference signals, comprising:
   receiving one or more uplink positioning reference signal measurement values associated with a user equipment from one or more wireless nodes;
   determining a downlink positioning reference signal configuration based at least in part on the one or more uplink positioning reference signal measurement values; and
   providing the downlink positioning reference signal configuration to the one or more wireless nodes.

12. The method of clause 11 further comprising performing an outlier rejection process on the one or more uplink positioning signal measurement values.

13. The method of either of clauses 11 or 12 further comprising receiving assistance data including uplink positioning reference signal beam information from the user equipment, and determining the downlink positioning reference signal configuration based at least in part on the assistance data.

14. The method of any of clauses 11-13 wherein the one or more uplink positioning reference signal measurement values include at least one of an angle of arrival, a signal strength, or a time of arrival.

15. The method of any of clauses 11-14 wherein the one or more uplink positioning reference signal measurement values are associated with a first bandwidth, and the downlink positioning reference signal configuration includes downlink positioning reference signals configured for transmission with a second bandwidth that is different from the first bandwidth.

16. The method of clause 15 wherein the first bandwidth is less than the second bandwidth.

17. The method of any of clauses 11-16 wherein the one or more uplink positioning reference signal measurement values are associated with uplink positioning reference signals transmitted in a first frequency layer, and the downlink positioning reference signal configuration includes downlink positioning reference signals configured for transmission in a second frequency layer that is different from the first frequency layer.

18. The method of clause 17 wherein the first frequency layer comprises lower frequencies than the second frequency layer.

19. The method of any of clauses 11-18 wherein the one or more wireless nodes includes the user equipment.

20. The method of any of clauses 11-19 wherein the downlink positioning reference signal configuration information includes at least one of a repetition factor, a resource time gap, a muting pattern, a comb size, or quasi co-location (QCL) information.

21. An apparatus, comprising:
a memory;
at least one transceiver;
at least one processor communicatively coupled to the memory and the at least one transceiver, and configured to:
transmit one or more uplink positioning reference signals;
receive downlink positioning reference signal configuration information associated at least in part with the one or more uplink positioning reference signals; and
measure one or more downlink positioning reference signals based at least in part on the downlink positioning reference signal configuration information.

22. The apparatus of clause 21 wherein the at least one processor is further configured to determine a location based at least in part on measurement values associated with the one or more downlink positioning reference signals.

23. The apparatus of either clause 21 or 22 wherein the at least one processor is further configured to transmit assistance data including uplink positioning reference signal beam information.

24. The apparatus of any of clauses 21-23 wherein the at least one processor is further configured to determine at least one of a time of arrival or a reference signal received power (RSRP) for at least one downlink positioning reference signal.

25. The apparatus of any of clauses 21-24 wherein the one or more uplink positioning reference signals utilize a first bandwidth and the one or more downlink positioning reference signals utilize a second bandwidth that is different from the first bandwidth.

26. The apparatus of any of clauses 21-25 wherein the one or more downlink positioning reference signals are quasi co-located with the one or more uplink positioning reference signals.

27. An apparatus, comprising:
a memory;
at least one transceiver;
at least one processor communicatively coupled to the memory and the at least one transceiver, and configured to:
receive one or more uplink positioning reference signal measurement values associated with a user equipment from one or more wireless nodes;
determine a downlink positioning reference signal configuration based at least in part on the one or more uplink positioning reference signal measurement values; and
provide the downlink positioning reference signal configuration to the one or more wireless nodes.

28. The apparatus of clause 27 wherein the at least one processor is further configured to perform an outlier rejection process on the one or more uplink positioning signal measurement values.

29. The apparatus of either clause 27 or 28 wherein the at least one processor is further configured to receive assistance data including uplink positioning reference signal beam information from the user equipment, and determine the downlink positioning reference signal configuration based at least in part on the assistance data.

30. The apparatus of any of clauses 27-29 wherein the one or more uplink positioning reference signal measurement values include at least one of an angle of arrival, a signal strength, or a time of arrival.

31. An apparatus for measuring downlink positioning reference signals, comprising:
means for transmitting one or more uplink positioning reference signals;
means for receiving downlink positioning reference signal configuration information associated at least in part with the one or more uplink positioning reference signals; and
means for measuring one or more downlink positioning reference signals based at least in part on the downlink positioning reference signal configuration information.

32. An apparatus for providing downlink positioning reference signals, comprising:
means for receiving one or more uplink positioning reference signal measurement values associated with a user equipment from one or more wireless nodes;
means for determining a downlink positioning reference signal configuration based at least in part on the one or more uplink positioning reference signal measurement values; and
means for providing the downlink positioning reference signal configuration to the one or more wireless nodes.

33. A non-transitory processor-readable storage medium comprising processor-readable instructions configured to cause one or more processors to measure downlink positioning reference signals, comprising:
code for transmitting one or more uplink positioning reference signals;
code for receiving downlink positioning reference signal configuration information associated at least in part with the one or more uplink positioning reference signals; and
code for measuring one or more downlink positioning reference signals based at least in part on the downlink positioning reference signal configuration information.

34. A non-transitory processor-readable storage medium comprising processor-readable instructions configured to cause one or more processors to provide downlink positioning reference signals, comprising:
code for receiving one or more uplink positioning reference signal measurement values associated with a user equipment from one or more wireless nodes;
code for determining a downlink positioning reference signal configuration based at least in part on the one or more uplink positioning reference signal measurement values; and code for providing the downlink positioning reference signal configuration to the one or more wireless nodes.

35. A method for transmitting positioning reference signals, comprising:
receiving one or more positioning reference signals transmitted from a user equipment;
providing one or more measurement values associated with the one or more uplink positioning reference signals to a network server;
receiving downlink positioning reference signal configuration information from the network server, the configuration information being based at least in part on the one or more measurement values; and
transmitting one or more downlink positioning reference signals based on the downlink positioning reference signal configuration information.

36. The method of clause 35 further comprising receiving assistance data including uplink positioning reference signal beam information from the user equipment.

37. The method of clause 36 wherein the beam information includes at least one of a boresight angle value, a beamwidth value, and a beam shape value.

38. The method of any of clauses 34-37 wherein the network server is a location management function.

39. The method of any of clauses 34-38 wherein the one or more measurement values includes at least one of an angle of arrival, timing information, and signal strength information associated with one or more uplink positioning reference signals.

40. An apparatus, comprising:
a memory;
at least one transceiver;
at least one processor communicatively coupled to the memory and the at least one transceiver, and configured to:
receive one or more positioning reference signals transmitted from a user equipment;
provide one or more measurement values associated with the one or more uplink positioning reference signals to a network server;
receive downlink positioning reference signal configuration information from the network server, the configuration information being based at least in part on the one or more measurement values; and
transmit one or more downlink positioning reference signals based on the downlink positioning reference signal configuration information.

41. The apparatus of clause 40 wherein the at least one processor is further configured to receive assistance data including uplink positioning reference signal beam information from the user equipment.

42. The apparatus of clause 41 wherein the beam information includes at least one of a boresight angle value, a beamwidth value, and a beam shape value.

43. The apparatus of any of clauses 40-42 wherein the network server is a location management function.

44. The method of any of clauses 40-43 wherein the one or more measurement values includes at least one of an angle of arrival, timing information, and signal strength information associated with one or more uplink positioning reference signals.

45. An apparatus for transmitting positioning reference signals, comprising:
means for receiving one or more positioning reference signals transmitted from a user equipment;
means for providing one or more measurement values associated with the one or more uplink positioning reference signals to a network server;
means for receiving downlink positioning reference signal configuration information from the network server, the configuration information being based at least in part on the one or more measurement values; and
means for transmitting one or more downlink positioning reference signals based on the downlink positioning reference signal configuration information.

46. A non-transitory processor-readable storage medium comprising processor-readable instructions configured to cause one or more processors to transmit positioning reference signals, comprising:
code for receiving one or more positioning reference signals transmitted from a user equipment;
code for providing one or more measurement values associated with the one or more uplink positioning reference signals to a network server;
code for receiving downlink positioning reference signal configuration information from the network server, the configuration information being based at least in part on the one or more measurement values; and
code for transmitting one or more downlink positioning reference signals based on the downlink positioning reference signal configuration information.

The invention claimed is:

1. A method of measuring downlink positioning reference signals, comprising:
transmitting one or more uplink positioning reference signals via one or more corresponding transmission beams;
receiving downlink positioning reference signal configuration information including beam pairing information and schedule information configured to remove incompatible downlink positioning reference signals based at least in part on measurements of the one or more uplink positioning reference signals and the one or more corresponding transmission beams obtained by one or more wireless nodes; and
measuring one or more downlink positioning reference signals based at least in part on the downlink positioning reference signal configuration information.

2. The method of claim 1 further comprising determining a location based at least in part on measurement values associated with the one or more downlink positioning reference signals.

3. The method of claim 1 further comprising transmitting assistance data including uplink positioning reference signal beam information.

4. The method of claim 1 wherein measuring the one or more downlink positioning reference signals includes determining at least one of a time of arrival or a reference signal received power (RSRP) for at least one downlink positioning reference signal of the one or more downlink positioning reference signals.

5. The method of claim 1 wherein measuring the one or more downlink positioning reference signals includes receiving a first downlink positioning reference signal of the one or more downlink positioning reference signals transmitted by a first wireless node, receiving a second downlink positioning reference signal of the one or more downlink positioning reference signals transmitted by a second wireless node, and determining a time difference of arrival based on a time of arrival for the first downlink positioning reference signal and a time of arrival for the second downlink positioning reference signal.

6. The method of claim 1 wherein the one or more uplink positioning reference signals utilize a first bandwidth and the one or more downlink positioning reference signals utilize a second bandwidth that is different from the first bandwidth.

7. The method of claim 6 wherein the first bandwidth is less than the second bandwidth.

8. The method of claim 1 wherein the one or more uplink positioning reference signals utilize a first frequency layer and the one or more downlink positioning reference signals utilize a second frequency layer that is different from the first frequency layer.

9. The method of claim 1 wherein the one or more downlink positioning reference signals are quasi co-located with the one or more uplink positioning reference signals.

10. A method of providing downlink positioning reference signals, comprising:
receiving one or more uplink positioning reference signal measurement values associated with a user equipment from one or more wireless nodes, wherein the one or more uplink positioning reference signal measurement values were received via one or more corresponding transmission beams;
determining a downlink positioning reference signal configuration including beam pairing information and schedule information configured to remove incompatible downlink positioning reference signals based at least in part on the one or more uplink positioning reference signal measurement values and the one or more corresponding transmission beams obtained by the one or more wireless nodes; and
providing the downlink positioning reference signal configuration to the one or more wireless nodes.

11. The method of claim 10 further comprising performing an outlier rejection process on the one or more uplink positioning signal measurement values.

12. The method of claim 10 further comprising receiving assistance data including uplink positioning reference signal beam information from the user equipment, and determining the downlink positioning reference signal configuration based at least in part on the assistance data.

13. The method of claim 10 wherein the one or more uplink positioning reference signal measurement values include at least one of an angle of arrival, a signal strength, or a time of arrival.

14. The method of claim 10 wherein the one or more uplink positioning reference signal measurement values are associated with a first bandwidth, and the downlink positioning reference signal configuration includes downlink positioning reference signals configured for transmission with a second bandwidth that is different from the first bandwidth.

15. The method of claim 14 wherein the first bandwidth is less than the second bandwidth.

16. The method of claim 10 wherein the one or more uplink positioning reference signal measurement values are associated with uplink positioning reference signals transmitted in a first frequency layer, and the downlink positioning reference signal configuration includes downlink positioning reference signals configured for transmission in a second frequency layer that is different from the first frequency layer.

17. The method of claim 16 wherein the first frequency layer comprises lower frequencies than the second frequency layer.

18. The method of claim 10 wherein the one or more wireless nodes includes the user equipment.

19. An apparatus, comprising:
a memory;
at least one transceiver; and
at least one processor communicatively coupled to the memory and the at least one transceiver, and configured to:
transmit one or more uplink positioning reference signals via one or more corresponding transmission beams;
receive downlink positioning reference signal configuration information including beam pairing information and schedule information configured to remove incompatible downlink positioning reference signals based at least in part on measurements of the one or more uplink positioning reference signals and the one or more corresponding transmission beams obtained by one or more wireless nodes; and
measure one or more downlink positioning reference signals based at least in part on the downlink positioning reference signal configuration information.

20. The apparatus of claim 19 wherein the at least one processor is further configured to determine a location based at least in part on measurement values associated with the one or more downlink positioning reference signals.

21. The apparatus of claim 19 wherein the at least one processor is further configured to transmit assistance data including uplink positioning reference signal beam information.

22. The apparatus of claim 19 wherein the at least one processor is further configured to determine at least one of a time of arrival or a reference signal received power (RSRP) for at least one downlink positioning reference signal of the one or more downlink positioning reference signals.

23. The apparatus of claim 19 wherein the one or more uplink positioning reference signals utilize a first bandwidth and the one or more downlink positioning reference signals utilize a second bandwidth that is different from the first bandwidth.

24. The apparatus of claim 19 wherein the one or more downlink positioning reference signals are quasi co-located with the one or more uplink positioning reference signals.

25. An apparatus, comprising:
a memory;
at least one transceiver; and
at least one processor communicatively coupled to the memory and the at least one transceiver, and configured to:
receive one or more uplink positioning reference signal measurement values associated with a user equipment from one or more wireless nodes, wherein the one or more uplink positioning reference signal measurement values were received via one or more corresponding transmission beams;
determine a downlink positioning reference signal configuration including beam pairing information and schedule information configured to remove incompatible downlink positioning reference signals based at least in part on the one or more uplink positioning reference signal measurement values and the one or more corresponding transmission beams obtained by the one or more wireless nodes; and
provide the downlink positioning reference signal configuration to the one or more wireless nodes.

26. The apparatus of claim 25 wherein the at least one processor is further configured to perform an outlier rejection process on the one or more uplink positioning signal measurement values.

27. The apparatus of claim 25 wherein the at least one processor is further configured to receive assistance data including uplink positioning reference signal beam information from the user equipment, and determine the downlink positioning reference signal configuration based at least in part on the assistance data.

28. The apparatus of claim 25 wherein the one or more uplink positioning reference signal measurement values include at least one of an angle of arrival, a signal strength, or a time of arrival.

* * * * *